April 13, 1954  J. DAUGHERTY  2,675,276
SLIDING WAY FOR MACHINE TOOLS AND METHOD OF MAKING SAME
Filed Sept. 24, 1951

INVENTOR
Jesse Daugherty

Patented Apr. 13, 1954

2,675,276

UNITED STATES PATENT OFFICE 2,675,276

SLIDING WAY FOR MACHINE TOOLS AND METHOD OF MAKING SAME

Jesse Daugherty, Fond du Lac, Wis., assignor to Giddings & Lewis Machine Tool Company, Fond du Lac, Wis., a corporation of Wisconsin Application September 24, 1951, Serial No. 248,044

3 Claims. (Cl. 308—3)

The present invention relates to machine tool ways and to a method of fabricating the ways.

The general object of the invention is to provide machine tool tables, saddles or other sliding members with improved sliding ways having buttressed wear plates arranged in a novel manner which makes feasible accurate finishing of the bearing surfaces of the installed wear plates within precise tolerances, which eliminates expensive machining operations entailed in the manufacture of conventional ways and otherwise effects reductions in the cost of manufacturing the ways as compared to that of conventional ways, which achieves an even distribution of the bearing load on the wear plates over the entire area of the plates, which in practice brings about a more accurate determination of the positional relationship of the slidable members relative to each other, which makes feasible the use of wear plates extending along the entire length of the ways to form continuous bearing surfaces even though the ways are fabricated from plastic material, and which prolongs the useful life of the ways by adapting the wear plates to be accurately and repeatedly refinished after prolonged usage until the thickness of the plates is reduced to an exceedingly small dimension.

Other objects and advantages will become apparent as the description proceeds.

Figure 1:
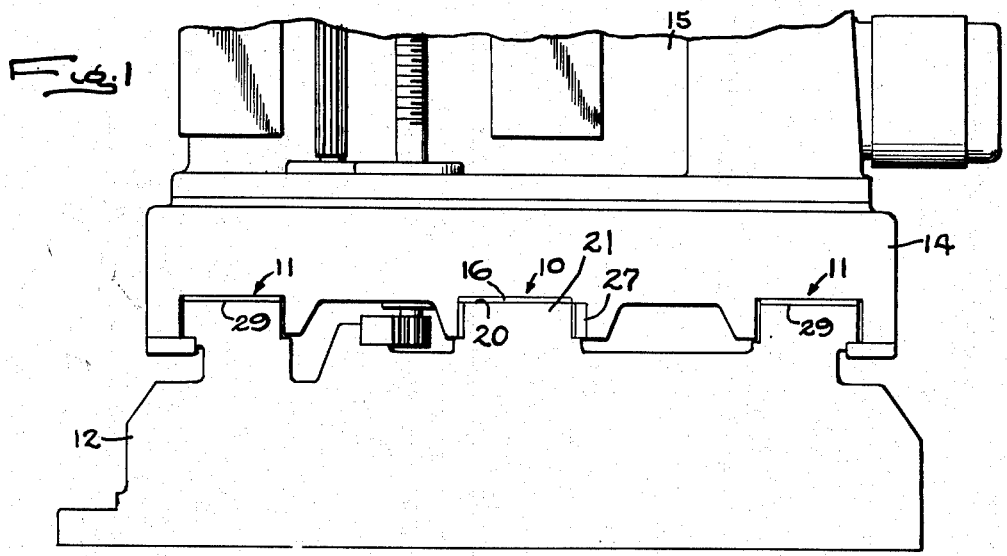
Figure 1 is a fragmentary end view of a machine tool having slidable parts equipped with the invention.

While the invention is susceptible of various modifications and alternative constructions, I have shown in the drawings and will herein describe in detail the preferred embodiments, but it is to be understood that I do not thereby intend to limit the invention to the specific forms disclosed, but intend to cover all modifications and equivalent constructions falling within the spirit and scope of the invention as expressed in the appended claims.

Machine tools of the type to which the present invention relates are provided with one or more movable work or tool bearing members, such as, tables and columns which are slidably mounted on either stationary or movable support members for angular or rectilinear movement relative to the support members. The movable members are supported and guided in their movements by means of complementary, elongated ways provided on the movable members and the respective support members and having sliding engagement with each other. The inevitable wear incident to sliding of the ways is, in the present construction, almost wholly absorbed by relatively soft wear plates attached to one of each pair of complementary ways to have sliding engagement with hard bearing surfaces on the coacting way, which is usually made an integral part of its associated machine member.

While the wear plates used in machine ways of the type herein described may be fabricated from soft bearing metals, the properties of certain plastic materials are such that wear plates made of these materials have advantages as to wearing ability, heat insulation, and other attributes which are not possessed by metal plates. For these reasons wear plates made of materials including plastic, one widely used material being laminated fabric impregnated with Formica, have hitherto gone into use in certain types of machine tool ways.

It has, however, been the accepted practice in fabricating ways of this type to secure the strips of plastic material forming the wear plates in position by a variety of mechanical attaching means, such as, pins, countersunk screws, and clamping plates. Although plastic wear plates held in position by mechanical elements of this sort have manifested certain advantages, these advantages have nevertheless been circumscribed by limitations imposed by the mechanical attaching means and have been actually offset to some extent by detrimental and disadvantageous factors attributable to the use of such means.

The present invention stems from the discovery that plastic wear plates can be cemented directly to buttressing surfaces on machine tool ways to become virtually integral parts of the ways, not only dispensing with mechanical attaching means hitherto used to hold the plates in place but also forming an eminently satisfactory way construction representing achievements in its own right and giving rise to advantages in the fabrication of the ways as well.

Figure 2:
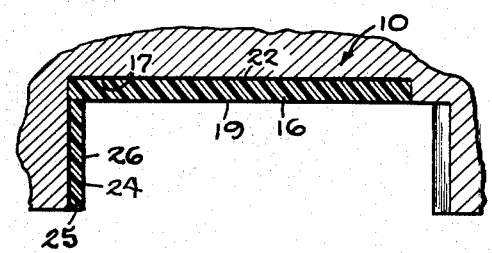
Fig. 2 is a fragmentary transverse sectional view of the central guide and support way of the translatable machine member showing, on a somewhat enlarged scale, the attachment of wear plates to the way.
Figure 3:
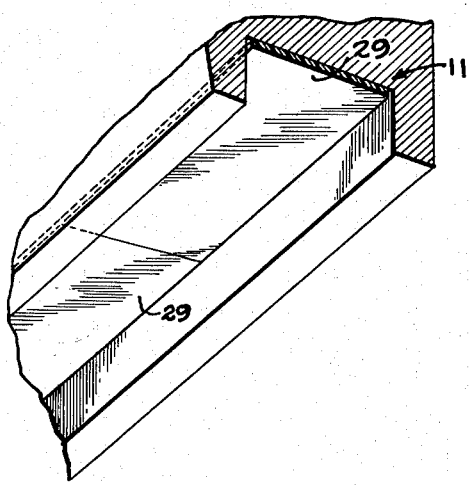
Fig. 3 is a fragmentary perspective view showing one end in section and illustrating the attachment of wear plates to a support way of the machine column.

Apprehension of the full import of the invention can be gained best through an appreciation of the achievements inherent in its application taken together with its structural implementation. Proceeding with the description of the latter, and having reference to the drawing, the first exemplary forms of the invention illustrated in Figs. 1 to 3, are incorporated in the complementary ways 10 and 11 of a horizontal boring, drilling, and milling machine of the type shown in U. S. Patent No. 2,251,015, issued July 29, 1941. As shown, the ways comprise the central guide and support way 10 and the two parallel support ways 11 disposed under the base 14 and extending longitudinally along the runway 12. It will be noted by reference to Figs. 1 and 2 that the guide and support way 10 comprises one or more plastic wear plates 16 attached to a flat horizontal buttressing surface 17 on the movable base 14 to form a downwardly facing support bearing surface 19 complemental to an upwardly facing bearing surface 20 defined on the elongated rail 21 integral with the runway 12.

In carrying out the invention the plastic wear plates 16 are bonded to the buttressing surface by a suitable cement, the coherence established between the buttressing surface and the wear plates causing the plates to become, in effect, an integral part of the buttressing parts. Preferably the wear plates are formed from rather rigid, molded strips of laminated fabric impregnated with a thermo-setting phenol-formaldehyde plastic compound, such as that commonly known as Formica or Micarta. The strips are preformed or cut to a width generally equal to the bearing surfaces 19 and 20 of the ways and are prepared for installation by being cleaned on the side to be cemented to the buttressing surface 17. One suitable cleaning agent which may be used for this purpose and also for cleaning the buttressing surface 17 is trichlorethylene. After cleaning of the surfaces, cement is applied preferably to both the plates and to the buttressing surface and the plates are set in place under pressure applied by weights, clamps, or the like to unite the parts by a cement bond 22, Fig. 2.

A cement which has been used for this purpose with very satisfactory results is a synthetic thermo-setting resin adhesive of the phenol resin chemical type. A commercially available cement of this character is sold by the Cycleweld Division of Chrysler Corporation under the trade name "Cycleweld." The type of this cement most suitable for purposes of the present invention is designated by the manufacturer as "C-12" and is prepared for use by mixing of one hundred parts of one ingredient, known as C-12A, with seven parts of a second ingredient, known as C-12B. The cement, thus prepared, is applied to the surfaces to be bonded to each other within approximately twenty minutes after the ingredients are mixed. The thickness of the film of cement to be used between the parts is not highly critical as comparable results are obtained with thicknesses ranging from three to ten thousandths of an inch. The parts coated with this cement are held together under pressure at room temperature to cure for six to eighteen hours.

After curing of the cement, every portion of the plastic wear plates 16 is solidly held against the buttressing surface 17 to the degree that the plate becomes virtually an integral part of the buttressing member rather than an appurtenance attached to it as is the case when the plates are secured in place by mechanical attaching means. In fact, the union between the plates 16 and the buttressing portion of the way is so complete that the assembly resounds with a metallic ring if a plate is tapped with a hammer.

By reason of this solid bond between the wear plates 16 and the buttressing surface 17, it becomes feasible, after the plates are set in place, to machine and scrape the outer plate surfaces 19 to the precise dimensional tolerances requisite of the bearing surface, which they form. The significance of the cemented union of the parts is best appreciated against the background of prior constructions employing mechanical attaching means taken in connection with the ever present requirement that the positional relationship of the slidable machine parts must be determined with extreme accuracy to enable the machines to carry out machining operations with the requisite precision. In machine tool ways in which the wear plates are held in place by screws, plates, or other attaching means, only portions of the wear plates immediately adjacent the attaching elements have rigid engagement with the buttressing surfaces. Portions of the wear plates more remote from the attaching elements are free to engage the buttressing surfaces less firmly with the result that a "blister" effect is present under these areas of the plates. It follows that whenever the ways are assembled into a machine tool and pressure is applied to the wear plates, portions of the plate bearing surfaces over these "blisters" are mashed toward the underlying buttressing surfaces to a greater extent than portions of the bearing surface immediately adjacent the mechanical attaching means. Thus, by "giving" under load, the portions of the wear plates remote from the attaching means fail to support their proportionate share of the load. As a consequence, the bearing load is unevenly distributed over the wear plates and areas of high bearing pressure intensity are created around the mechanical fastening elements. This not only detracts from the sliding efficiency of the ways but is conducive to accelerated wear on the plates which unduly shortens the life of the plates and tends to introduce inaccuracies in the relative position relationship of the ways as well.

In an endeavor to minimize the unevenness in the load distribution on wear plates held in place by mechanical fastening elements and to improve the accuracy with which machine parts are positioned by the ways, it has become an accepted practice to prefinish the wear plates to a precise even thickness and then attach them in place against buttressing surfaces which have been finished with an accuracy comparable to that required of the bearing surfaces. Formation of such precisely finished buttressing surfaces has, however, necessitated quite expensive machining and finishing operations on the hard metal buttressing surfaces which have materially added to the cost of fabricating the ways. Moreover, the non-uniformity of the bearing loading and its deleterious effects are not eliminated entirely. In practice, there is still some tendency for the loading to be concentrated about the mechanical attaching elements, possibly because of the constraining effect of the elements on adjacent portions of the plates. In this connection, it will be perceived that finish scraping of the bearing surfaces of the plates after the plates are secured in place by the mechanical elements will not materially improve the uniformity of the bearing loading because portions of the wear plates over the previously mentioned "blisters" are to some extent "buckled" from the buttressing surfaces before they are subjected to the pressure of the ways. To smooth off the tops of these "buckled" portions would only thin the plates at these spots and accentuate the non-uniformity of the bearing loading.

Reverting now to the present invention, the achievements effected by the invention are more readily discernible. By virtue of the cemented bond established between the wear plates 16 and the buttressing surface 17 the surface affords a rigid support for the plates and is in solid engagement with the latter along the entire area of the plates. Consequently, each portion of the plates will stand up under load to the same extent as every other portion of the plates. The blistering effect present in ways, in which mechanical wear plate attaching means are used, is entirely absent. As a result, the bearing load is uniformly distributed over the wear plates to the end that less wear is incurred on the plates. Moreover, the sliding characteristics of the ways is improved and the accuracy with which the supported machine parts are positioned by the ways is increased as compared to plates in which the loading is spotty.

In this connection it will be further appreciated that since the wear plates 16 are at all times solidly supported by and securely cemented to the buttressing surface 17 along the entire area of the plates, there is no buckling of the plates relative to the underlying buttressing surface even when there is no bearing load on the plates. Thus, the bearing surface 19 which is scraped flat, after the wear plates are cemented in place but still unloaded, will remain flat when a load is imposed and at the same time absorb the load without being subject to uneven pressure intensities.

At this point it is fitting to point out that it is preferred that the cement bond 22 extend entirely over the face of the plate 12 which coheres with the buttressing surface 17. Should the cement be applied to the parts in a pattern rather than a continuous coating, the areas not covered with cement should not be sufficiently large to give rise to the deleterious "blister effect" between the plate and the buttressing surface which is encountered when mechanical attaching means are used.

A further and most significant advantage which is realized from the cemented wear plate construction in which the bearing surfaces are finished after the plates are set in place is the elimination of the expensive and time consuming precision machining of the buttressing surface 17 entailed in the construction of ways in which mechanical wear plate attaching elements are used. Since the shaping and disposition of the bearing surface is in the last analysis determined by machining and hand scraping of the outer surface of the wear plates 16, there is no necessity for precision finishing of the buttressing surface 17. This surface can therefore be formed by a free cutting or roughing tool, a quite inexpensive operation. The overall savings in the manufacturing cost thus realized are appreciable, it being understood that finishing the relatively soft and easily worked wear plates 16 is much faster and less expensive than precision finishing of the hard metal buttressing surface.

Figure 4:
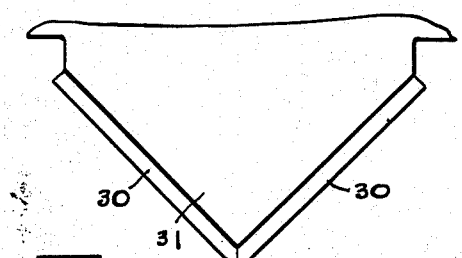
Fig. 4 is an end view of a different form of guide way and showing the attachment of wear plates to buttressing surfaces of the way.

While the description of the illustrated embodiments of the invention thus far has been confined to the support way of the support and guide way 10 it will be understood that the invention is susceptible of use in a wide variety of machine tool ways. To demonstrate more fully the scope of its utility reference is made to Figs. 1 to 4. As shown in Figs. 1 and 2, vertically disposed wear plates 24 are cemented to a vertical buttressing surface 25 of the guide and support way 10 to define a longitudinal guide surface 26 held in sliding engagement with a complementary guide surface on the rail 21 by an adjustable gib 27 carried by the base 14 in position to engage the opposite side of the rail. As shown in Figs. 1 and 3, wear plates 29 are cemented to a horizontal buttressing surface of the longitudinal support way 11. As demonstrated in Fig. 4, the invention may be applied in cementing inclined wear plates 30 to intersecting buttressing surfaces of an elongated V-type way 31 commonly used to support a movable machine work table (not shown). In each of these illustrated applications of the invention, the ways are fabricated in the same manner described in connection with the supporting way of the guide and support way 10.

It has been found that even though wear plates have a tendency to expand because of heat generated upon sliding of the ways and for other possible reasons, the plates can, if cemented in place in accordance with the present invention, be abutted end to end to form continuous way surfaces (see Fig. 3) without ill effect. Thus, it becomes unnecessary to break the continuity of the way surfaces to provide space between the plates to accommodate expansion. Even though the theoretical explanation for the ability of the cemented plates to obviate their tendency to expand endwise is not wholly understood, it is believed that the plates become so nearly an integral part of the buttressing members of the ways by virtue of the cement bond that the longitudinal expansion forces in the plates are wholly constrained by the adjoined buttressing parts.

As previously mentioned, ways constructed in accordance with the invention are exceedingly durable because of the even distribution of the bearing loads over the wear plates and other factors. When wear on the plates does take place, however, after long periods of use they may be readily reconditioned in a very simple manner. All that is necessary is that the bearing surfaces on the wear plates be refinished in much the same manner as they are finished after the plates are first cemented in place. Again the advantages of the virtually integral relationship between the plates and the buttressing parts come into full play, not only by making feasible the simplified reconditioning procedure but by imparting the advantages of evenly distributed bearing loads to the ways reconditioned in this manner.

The total useful life of ways embodying the concepts of the invention is further prolonged by the adaptability of the ways to be repeatedly reconditioned until the wear plates are thinned to a thickness of only a few thousandths of an inch, which adaptability stems from the fact that the plates are held in place through cohesion with the buttressing surfaces and not by mechanical elements which would, on thinning of the plates, score the complementary way surfaces long before the plates are reduced to a thickness at which the cemented plates require replacing.

In the event the cemented wear plates should require replacement after extremely long usage, such replacement is a relatively simple matter. The old plates are removed with a scraper or the like and the new ones are cemented in place just as the original plates were installed.

I claim as my invention:

1. A machine tool comprising a bed having a supporting way, a traveling table or the like having a way adapted to cooperate with said first way in providing a sliding support for said table or the like, one of said ways having a smooth accurately finished supporting surface and the other of said ways having a roughly finished surface opposing said accurately finished surface, and a plurality of flat wear plates composed of plastic impregnated fabric disposed in end to end abutting relation and rigidly secured throughout their entire areas to said roughly finished surface by the interposition, between the backs of said plates and said roughly finished surface, of a plastic adhesive whereby said plates are immovably anchored to and solidly supported throughout their entire areas by said roughly finished surface so as to form in effect an integral structure, the exposed surfaces of said plates being accurately machined to provide a continuous surface complemental to said accurately finished way surface and adapted to slide thereon.

2. In a machine tool, a stationary member having a guideway thereon providing an elongated bearing surface, a traveling member reciprocable relatively to said stationary member and having a guideway thereon providing a complemental elongated bearing surface opposed to said stationary bearing surface, one of said bearing surfaces being smooth and accurately finished, a plurality of flat plastic wear plates disposed between said bearing surfaces and rigidly bonded to the other of said bearing surfaces in end to end abutting relation, and means providing an adhesive bond between the entire area of one face of said plates and the complemental area of said bearing surface to which said plates are bonded for so integrally uniting said plates with said last mentioned surface that the plates are solidly and immovably supported throughout their entire area and are precluded from expanding and contracting longitudinally relatively to the surface to which they are bonded.

3. The method of making a machine tool way structure for a pair of relatively slidable machine tool elements, comprising accurately finishing a metal way surface on one of said elements, roughly finishing on the other of said elements a buttress surface generally complemental to said way surface, bonding a plurality of rigid molded plastic wear plates to said buttress surface in end abutting relation to one another by introducing between said wear plates and said buttress surface a substantially continuous layer of plastic adhesive, pressing said plates toward said buttress surface during the setting of said adhesive to rigidly bond said plates throughout their entire area to the supporting buttress surface, and machining the outer faces of said abutting wear plates after such bonding to form a continuous, flat and smooth surface on the outer faces of said wear plates accurately complemental to said finished way surface.

References Cited in the file of this patent

UNITED STATES PATENTS

| Number | Name | Date |
| --- | --- | --- |
| 2,220,210 | Chace | Nov. 5, 1940 |
| 2,250,561 | Wissler | July 29, 1941 |
| 2,251,015 | Gallimore | July 29, 1941 |
| 2,265,900 | Gilbert | Dec. 9, 1941 |
| 2,267,342 | Schwartz | Dec. 23, 1941 |
| 2,452,284 | Beare | Oct. 26, 1948 |
| 2,479,653 | Walter | Aug. 23, 1949 |

FOREIGN PATENTS

| Number | Country | Date |
| --- | --- | --- |
| 599,157 | Great Britain | Mar. 5, 1948 |

OTHER REFERENCES

"Gleitführungen aus Guseisen und Kunststoffen," published in Maschinenbau, Der Betrieb, pages 299–302, of July 1942.

"Hochbelastbare Lager aus Kunstharz-Presstoff," published in VDI-Zeitschrift, Bd. 86, Nr. 9/10, pages 139–144, of March 7, 1942.